(12) United States Patent
Bertens et al.

(10) Patent No.: US 8,487,958 B2
(45) Date of Patent: Jul. 16, 2013

(54) METHOD AND SYSTEM FOR CHANGING IMAGE DENSITY AND CONTRAST

(75) Inventors: Tom Bertens, Perk (BE); Pieter Vuylsteke, Mortsel (BE)

(73) Assignee: Agfa HealthCare N.V., Mortsel (BE)

( * ) Notice: Subject to any disclaimer, the term of this patent is extended or adjusted under 35 U.S.C. 154(b) by 882 days.

(21) Appl. No.: 12/625,736

(22) Filed: Nov. 25, 2009

(65) Prior Publication Data

US 2010/0189375 A1 Jul. 29, 2010

Related U.S. Application Data

(60) Provisional application No. 61/118,498, filed on Nov. 28, 2008.

(30) Foreign Application Priority Data

Nov. 27, 2008 (EP) ..................... 08170064

(51) Int. Cl.
*G06T 5/00* (2006.01)

(52) U.S. Cl.
USPC .......................................... 345/619; 345/661

(58) Field of Classification Search
CPC .................................................. G06T 2200/24
USPC ........................................ 345/661, 664, 665
See application file for complete search history.

(56) References Cited

U.S. PATENT DOCUMENTS

| 5,270,806 | A | 12/1993 | Venable et al. |
| 5,542,003 | A | 7/1996 | Wofford |
| 5,739,809 | A | 4/1998 | McLaughlin et al. |
| 5,867,169 | A | 2/1999 | Prater |
| 6,181,321 | B1 | 1/2001 | Zhao et al. |
| 6,940,526 | B2 | 9/2005 | Noda et al. |
| 7,298,373 | B2 | 11/2007 | Vuylsteke |
| 7,298,383 | B2 | 11/2007 | Vuylsteke |
| 2002/0030634 | A1* | 3/2002 | Noda et al. ..................... 345/5 |
| 2004/0252132 | A1 | 12/2004 | Vuylsteke |
| 2004/0252133 | A1 | 12/2004 | Vuylsteke |

FOREIGN PATENT DOCUMENTS

| EP | 0 527 525 A2 | 2/1993 |
| EP | 0 833 501 A2 | 4/1998 |
| EP | 0 911 729 A1 | 4/1999 |
| WO | 02/27657 A2 | 4/2002 |

OTHER PUBLICATIONS

"Adobe Photoshop 5.0 User Guide," Adobe Photoshop 5.0 User Guide, Steps 3 and 4, 1998, pp. 50-51, and 105-133.
Anonymous, "Adobe Photoshop 5.0 User Guide," Adobe Systems, "Using the magic wand tool," 1998, pp. 137-164.
Anonymous, "Adobe Photoshop 5.0 User Guide," Adobe Systems, "Using the Adobe Photoshop Color Picker," 1998, pp. 197-222.
European Search Report dated Apr. 20, 2009, from counterpart European Patent Application No. EP 08 17 0064, filed on Nov. 27, 2008.

* cited by examiner

*Primary Examiner* — Jeffery A Brier
(74) *Attorney, Agent, or Firm* — Houston & Associates, LLP

(57) ABSTRACT

At least one of two enhancement methods for changing contrast and/or density are applied to an image. According to a first enhancement method the window width/level settings of the image are modified and according to a second enhancement method density and contrast of the image are modified by modifying a multi-scale representation of the image whereby modification is derived from at least two gradient functions determined at different scales, a gradient function at a specific scale specifying the dependency of contrast amplification at said scale as a function of density. The amount of modification obtained by applying either of said first and second enhancement methods is determined by the amount of movement of at least one indicium.

17 Claims, 5 Drawing Sheets

METHOD AND SYSTEM FOR CHANGING IMAGE DENSITY AND CONTRAST

RELATED APPLICATIONS

This application claims priority to European Patent Application No. EP 08170064.3 filed on Nov. 27, 2008, and claims the benefit under 35 USC 119(e) of U.S. Provisional Application No. 61/118,498, filed on Nov. 28, 2008, both of which are incorporated herein by reference in their entirety.

BACKGROUND OF THE INVENTION

In a typical medical workstation the appearance of a displayed image can be adjusted by selecting a relevant subrange of the image's grey value pixel data and converting the data in this subrange according to a specific gradation function.

An interactive method to adjust manually the width and the position of the selected subrange is commonly known as window width/level adjustment.

Such a transformation of grey value pixel data is mainly used to increase the contrast in some regions of the image or in a selected subrange of the grey value pixel data. The price to be paid is decreased contrast in other parts of the image and other ranges of the grey value pixel data.

The density of pixels and image regions is determined by the corresponding ordinate value of the gradation function. The contrast amplification of pixels and image regions on the other hand, is determined by the corresponding derivative value (i.e. the gradient) of the gradation function. As a consequence, if the shape of the gradation function is adjusted to accommodate a large subrange of grey values within a specified density interval, i.e. if the interval has to cope with wide latitude, then at the same time the contrast in that density interval will drop. On the other hand, if a density interval is assigned to only a narrow grey value subrange, then that interval will provide enhanced contrast.

If requirements with respect to density and contrast amplification are conflicting, which is often the case, then a compromise is unavoidable.

In the context of this document the term 'first enhancement method' will be used to refer to these kinds of methods and more specifically to the window width/level method.

In order to convert the digital image information optimally into a visible image on which the diagnosis is performed, a multi-scale image processing method (also called multiresolution image processing method) has been developed by means of which the density and contrast of an image can be modified. More specifically the density and contrast can be modified independently. In the context of this document the term 'independently' relates to processing methods in which modification of contrast does not have substantial influence on the density levels in the image and wherein modification of the density does not substantially influence the contrast in the image.

The above mentioned image processing method and user interface pertaining to such a method has been described extensively in U.S. Pat. No. 7,298,383, the processing being referred as multi-scale gradation processing.

In the context of this document the term 'second enhancement method' refers to multi-scale gradation processing methods.

In a specific embodiment of U.S. Pat. No. 7,298,383, the modification is a global modification, i.e. the change of contrast and density is applied to substantially all pixels of the displayed image.

SUMMARY OF THE INVENTION

One of the advantages of the first enhancement method is the possibility to select a subrange of pixel values to be enhanced. The disadvantage is the dependency between density and contrast adjustment.

One of the advantages of the second enhancement method is the possibility to independently adjust the density and contrast of a displayed image. However, this method is not suited to accurately select a subrange of pixel values to be enhanced.

The present invention relates a method for modifying at least one of contrast and density of an image. The present invention has the capability of providing a method which has the advantages of both of the enhancement methods.

According to the present invention at least one of density and contrast of an image is modified by applying at least one of a first enhancement method for changing density and contrast by modifying the window width/level settings of said image and a second enhancement method for changing density and contrast by modifying a multi-scale representation of the image whereby modification is derived from at least two gradient functions determined at different scales, a gradient function at a specific scale specifying the dependency of contrast amplification at said scale as a function of density. The amount of modification obtained by applying either of said first and second enhancement methods is determined by the movement of at least one indicium.

The method of the present invention can be implemented as a user interface on a display station, the user interface enabling to steer the amount of enhancement obtained according to the method of the present invention by moving at least one indicium (occasionally on the display screen).

In the context of the present invention the term 'modification' refers to density and/or contrast modification.

In the context of the present invention the term 'indicium' refers to a marker movable by means of a cursor, joy stick, button, mouse click, movement of arrows on a keyboard, speech or the like by means of which the user can indicate an amount of movement which, in accordance with the present invention, corresponds with an amount of contrast and density change of the displayed image resulting from either of the enhancement methods.

The indicium can be displayed but does not need to be displayed.

The method of the present invention is applicable to images that have been subjected to multi-scale gradation processing as is described further on in this text. However, the method is also applicable to other implementations of contrast rendition whereby contrast amplification and density can be specified independently.

The methods in accordance with the present invention are applicable to any kind of monochrome digital images as well as to colour images. To this end, the colour images comprising three components for each pixel, commonly representing the red, green and blue channel inputs of video equipment (RGB), are preferably converted into a standard colour space that represents hue, saturation and luminance (HSL). If an image is represented in this colour space, then the methods in accordance with the present invention are preferably applied to the luminance component only, as if it were a monochrome image. If only this channel is affected, then the contrast and density can be adjusted without introducing colour distortions.

The method of the present invention are suited for modifying the contrast and density of any kind of (monochrome and color) images obtained from a wide variety of acquisition devices in a wide variety of fields of applications wherein interactive modifications of density and/or contrast can be performed.

The method has been developed for application to medical images such as digital medical images obtained by means of computed or direct radiography.

However, examples of other applications than medical imaging in which the method and user interface can be applied are the following (non exhaustive): modification of images obtained by scanning systems and digital cameras in the field of photofinishing, in aerial photography, prepress, application to video images e.g. for image restoration, digital film paste up on computer etc. The invention is not limited to the enumerated acquisition methods and enumerated fields of application.

The method of the present invention is generally implemented in the form of a computer program product adapted to carry out the method steps of the present invention when run on a computer. The computer program product is commonly stored in a computer readable carrier medium such as a CD-ROM. Alternatively the computer program product takes the form of an electric signal and can be communicated to a user through electronic communication such as from a web based download site.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
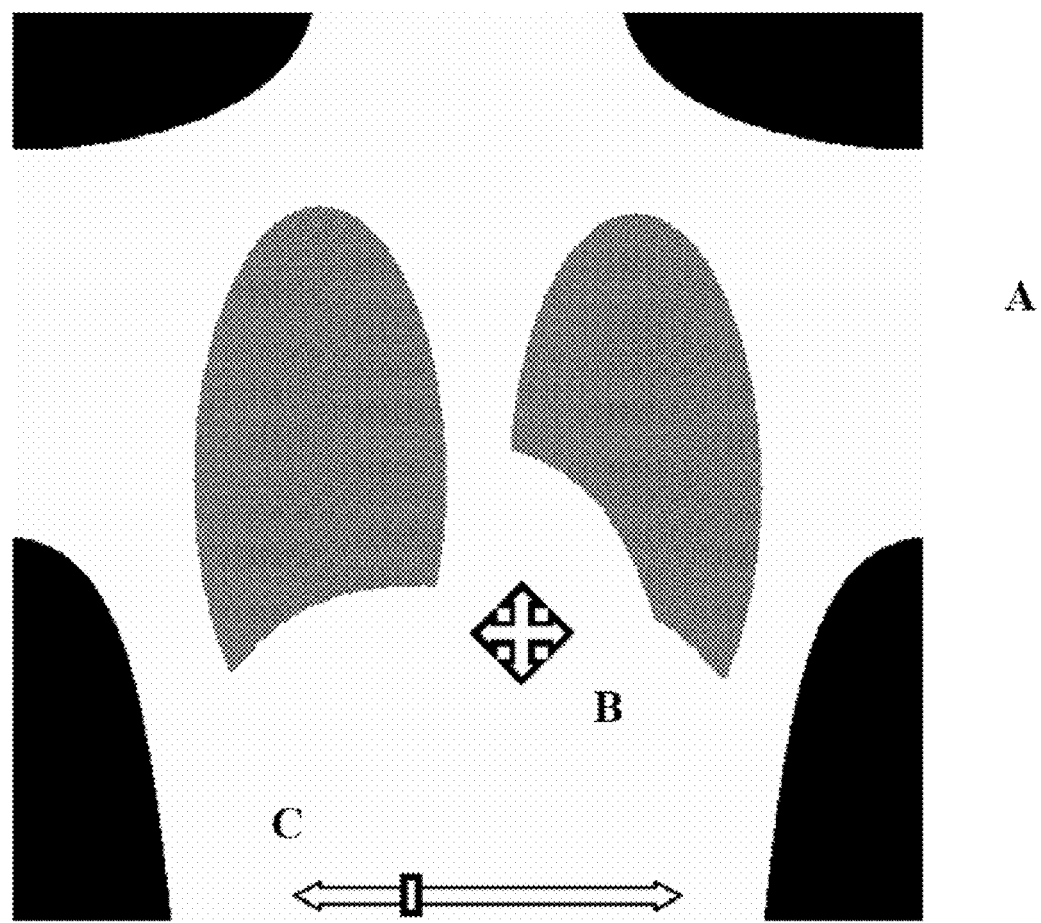
FIG. 1 shows a first embodiment of a display window and interactive user controls for the adjustment of density and contrast according to the present invention.

According to the present system and method two enhancement methods are used to modify contrast and/or density of an image that is e.g. displayed on a monitor.

A first enhancement method is used for changing the contrast and/or density of a displayed image by modifying the window width/level settings of the image.

A second enhancement method is used for changing the contrast and/or density independently by modifying the multi-scale representation of the image. The modification is derived from at least two gradient functions determined at different scales whereby a gradient function at a specific scale specifies how contrast amplification at that scale depends on density. This method is known as multi-scale gradation processing. This type of enhancement methods is described extensively in U.S. Pat. No. 7,298,383, which is incorporated herein by this reference in its entirety.

In a first processing step the raw digital image is decomposed into at least two detail images at successive scales and occasionally a residual image (further referred to as multi-scale representation), according to a multi-scale transform. The components of the multi-scale representation are referred to as detail images. The pixel values of the multi-scale representation correspond with the contrast of elementary image components, relative to their close neighbourhood.

Next the processed multi-scale representation is subjected to a reconstruction step by applying the inverse of the decomposition transform to the modified detail images.

In the course of reconstruction, a series of scale-specific conversion functions are consecutively applied to the partially reconstructed image, in order to adjust contrast amplification as a function of both grey value and scale. The thus obtained pixel values are the driving values for the hard- or softcopy reproducing device, further on referred to as density values.

At each stage in the reconstruction process where a conversion function is inserted, the latter is applied to the approximation image at a scale corresponding to the current iteration, and the result of conversion is used as the input image of the next iteration, as described below.

For example in case of a multi-scale gradation embodiment according to the Burt pyramid transform, the normal inverse transform is modified as follows.

From the iteration that corresponds with the scale k=L until the smallest scale k=0, the computed approximation image $v_k$ is pixelwise converted by a scale-specific conversion function $f_k(\ )$ before it is passed to the next iteration.

By an appropriate choice of the series of conversion functions $f_k(\ )$ it is possible to specify the contrast amplification as a function of grey value and scale, and to specify grey value-to-density mapping independently from contrast amplification.

To this end, the scale-specific conversion functions $f_k(\ )$ are determined as will be described below, starting from a series of functions $gm_k(\ )$, referred to as scale-specific gradient functions. For a specific scale k, the corresponding scale-specific gradient function $gm_k(\ )$ specifies the amount of contrast amplification at that scale. Equivalently, the scale-specific gradient function at scale k specifies how much a small pixel value difference (i.e. scale-specific contrast) at that scale is amplified by the combined effect of all concatenated conversion functions $f_k(\ )$ up to the smallest scale k=0.

Also, the scale-specific gradient function $gm_k(\ )$ specifies to which extent the finally reconstructed image $z_0$ is sensitive to a unit detail arising from a pixel with unit value in the corresponding detail image, i.e. $b_k$ in case of the Burt pyramid transform.

The scale-specific gradient functions are equivalent to the partial derivative functions:

$$gm_k(t) = \frac{\partial z_0}{\partial z_{k+1}}, k = 0, 1, \ldots, L$$

in which $z_k$ represents the image that results from pixelwise applying the conversion function $f_k(\ )$ to the approximation image $v_k$, and $t=v_L$, i.e. the pixel value of the partially reconstructed image at scale L, which is the largest scale involved in multi-scale gradation. In the present context, the pixel values t are referred to as the large-scale average grey values.

Relying on the concatenation rule for derivation, the scale-specific gradient functions can be written as:

$$gm_k(t) = f_0'(F_1(t) \cdot f_1'(F_2(t)) \cdot \ldots \cdot f_k'(t),$$

in which $f_k'(t)$ represent the derivative functions of the scale-specific conversion functions.

The cumulative conversion functions at subsequent scales are the concatenation of scale-specific conversion functions $f_k(\ )$ from the largest scale L involved in multi-scale gradation, up to the scale considered:

$$F_k(t) = f_k \circ f_{k+1} \circ \ldots \circ f_L(t),$$

in which the operator o stands for function concatenation.

The derivative of a cumulative conversion function with respect to t is equal to:

$$F_k'(t) = f_k'(F_{k+1}(t) \cdot f_{k+1}'(F_{k+2}(t)) \cdot \ldots \cdot f_L'(t),$$

or equivalently, the derivatives of cumulative conversion functions can be expressed in terms of scale-specific gradient functions:

$$F_0'(t) = gm_L(t)$$
$$F_k'(t) = \frac{gm_L(t)}{gm_{k-1}(t)}$$
$$k = 1, 2, \ldots, L$$

The cumulative conversion functions are then obtained by integration:

$$F_0(t) = \int_{t_0}^{t} gm_L(x) \cdot dx$$
$$F_k(t) = \int_{t_0}^{t} \frac{gm_L(x)}{gm_{k-1}(x)} \cdot dx$$
$$k = 1, 2, \ldots, L,$$

where $t_0$ is the abscissa t at which $F_k(t)=0$. This parameter determines the offset of the cumulative conversion functions. For convenience, it may be set to 0; then all cumulative conversion functions will cross the origin of the coordinate system.

The scale-specific conversion functions $f_k(\ )$ are finally obtained by inversion of the cumulative conversion functions $F_k(t)$:

$$f_k(\ ) = F_k \circ F_{k+1}^{-1}(\ ), k=0,1,\ldots,L-1$$

$$f_L(\ ) = F_L(\ )$$

Initial Intermediate-Scale Gradient Functions

In an interactive adjustment session, the initial state of the multiscale gradient functions and the corresponding displayed image are determined by the default window width/level settings with equal gradient functions for all scales.

With each adjustment induced by a user interaction an updated series of multiscale gradient functions is generated by applying changes to the initial series.

Upon every change the above method of multiscale gradation is applied to the updated multiscale gradient functions and preferably the resulting image is displayed to provide the user with feedback about the adjustment. This way, any desired modification of density or contrast can be efficiently accomplished by one or more user-induced adjustments, thereby significantly improving the workflow, also in difficult cases that require critical adjustments.

The first enhancement method is used to modify the contrast and density of the displayed image according to an amount of the movement of the indicium, denoted by dl and dw.

The change of the contrast and density of the displayed image resulting from the first enhancement method, similar to the result obtained by adjusting the window width/level settings, is obtained by modifying all the relevant multiscale gradient functions $gm_k(t)$ in the same way. The initial multiscale gradient functions $gm0_k(t)$ are rescaled and slid along the abscissa axis according to an amount of the movement of the indicium:

$$gm_k(t) = a^* gm0_k(a^*t+b), k=S, \ldots, L$$

with
a rescale factor and b intercept deduced from dl and dw

An implementation to deduce a and b from dl and dw is the window level/width linear conversion formula of the DICOM standard:

$$y = ((t-(l_i+dl-0.5))/(w_i+dw-1)+0.5)^*(y_{max}-y_{min})+y_{min}$$

with
(wi, li) the initial window width/level settings
$[y_{min}, y_{max}]$ the range of the output value On top of the modifications of the contrast and density of the displayed image resulting from the first enhancement method, the contrast and density of the displayed image are also modified resulting from the second enhancement method to an amount of the movement of the indicium, denoted by dg and dc. The multiscale gradient functions, eventually modified by the first enhancement method, are modified according to the method of multiscale gradation processing.

Preferably the multiscale contrast adjustment dc is carried out in a multiplicative way on the small-scale gradient function, i.e. in proportion to the contrast resulting from the first enhancement method.

The resulting small-scale gradient function is computed as:

$$gm_S(t) = a^* gm0_S(a^*t+b)^* 10^{dc/10}, \text{ with } dc \text{ is expressed in dB}$$

Alternatively, the contrast is adjusted by shifting the small-scale gradient function in ordinate direction by an amount dc.

Next, the multiscale density adjustment dg is established by applying a gamma correction to the initial large-scale gradation function $y_L0(t)$ resulting in a mapping the mid grey pixel values to an output pixel value at 50%+dg of the output range with dg expressed in percentages. The adjusted large-scale gradation function is denoted by $y_L(t)$:

$$y_L(t) = f(y_L0(a^*t+b))$$

with $$f(x) = ((c^*x+d)^{\gamma}-d)/c$$

c and d rescale factor and offset to normalize the range of x to the range [0, 1]
$\gamma$ the exponent computed as $-\log((50+dg)/100)/\log(2)$ Alternatively, the multiscale density adjustment dg is established by applying following function to the initial large-scale gradation function yL0(t):

$$f(x) = y\min + (y\max - y\min)*(1 - e(\gamma*x))/(1 - e\gamma)$$

with
x within the range [0, 1]
[ymin, ymax] the range of the output value
γ computed as 2*log((50−dg)/(50+dg))

Still another alternative to establish the multiscale density adjustment dg is to shift the large-scale gradation function yL0(a*t+b) in ordinate direction by an amount dg.

The derivative of the adjusted large-scale gradation function yields the adjusted large-scale gradient function gmL(t).

A series of adjusted intermediate-scale gradient functions is obtained according to the following preferred embodiment, based on the adjusted versions of the small-scale and large-scale gradient functions:

$$gm_k(t) = gm_S(t) \cdot \left( \frac{gm_L(t)}{gm_S(t)} \right)^{\frac{k-S}{L-S}}, k = S+1, S+2, \ldots, L-1$$

If finally the reconstruction procedure of multiscale gradation is applied using the adjusted gradient functions $gm_k$, then an image with adjusted density and contrast results, in accordance with the findings of the present invention.

In a specific embodiment the first enhancement method is handled as special case of the second enhancement method. The first enhancement method can be established by modifying the multi-scale representation, wherein modification is obtained by rescaling and sliding the specification of the gradient functions along the abscissa axis.

In accordance with the findings of the present invention, it is possible to simultaneously adjust the window width/level settings and independently adjust the contrast and density using the above described multi-scale representation of a processed image and the multi-scale gradation processing technique.

Different embodiments of the present invention are described below.

FIG. 1

FIG. 1 shows a display window A on which a medical image is displayed. Two movable indicia B and C (in the form of a slider) are shown.

The required amounts of density and contrast adjustment denoted by dy and dx are indicated by the movement of an indicium, i.e. a cursor (B in FIGS. 1 and 2) in a window (A in FIG. 1, FIG. 2), or by any two-dimensional pointing device or interactive controller. Preferably, the window in which the cursor can be moved is the image window, so that the viewer doesn't have to remove focus from the image during adjustment. Alternatively, two separate one-dimensional GUI controls can be used to specify the required amounts of adjustment dy and dx, such as two sliders or scroll bars.

In FIG. 1, the movement of a first indicium B relative to an initial reference position is used to determine the amount of image enhancement. The movement of an additional indicium C relative to a reference position is used to determine the amount of density and contrast enhancement obtained by applying a contrast enhancement method of the first type relative to the amount of density dg and contrast adjustment dc obtained by the second type.

Such an additional indicium can be implemented by means of a mouse click or by means of an additional button to toggle between applying the density and contrast adjustment by the first enhancement method only and applying the density and contrast adjustment by the second enhancement method only.

$dc=dx$ and $dw=0, dg=dy$ and $dl=0$ (only multi-scale gradation processing)

or $dc=0$ and $dw=dx, dg=0$ and $dl=dy$ (only window width/level processing)

In the embodiment shown in FIG. 1, the additional indicium is a slider (C) and the position of the slider denoted by x is used to gradually specify the relative amount of density and contrast adjustment by the first enhancement method and the relative amount of density and contrast adjustment by the second enhancement method. Positioning the slider at one side (x=0) corresponds with establishing the contrast and density adjustment completely by the first enhancement method and positioning the slider at the opposite side (x=1) corresponds with establishing the contrast and density adjustment completely by the second enhancement method. This is reflected in the following formula for the amounts of adjustments by the two enhancement methods:

$dc=x*dx$ and $dw=(1-x)*dx, dg=x*dy$ and $dl=(1-x)*dy$

FIG. 2

Figure 2:
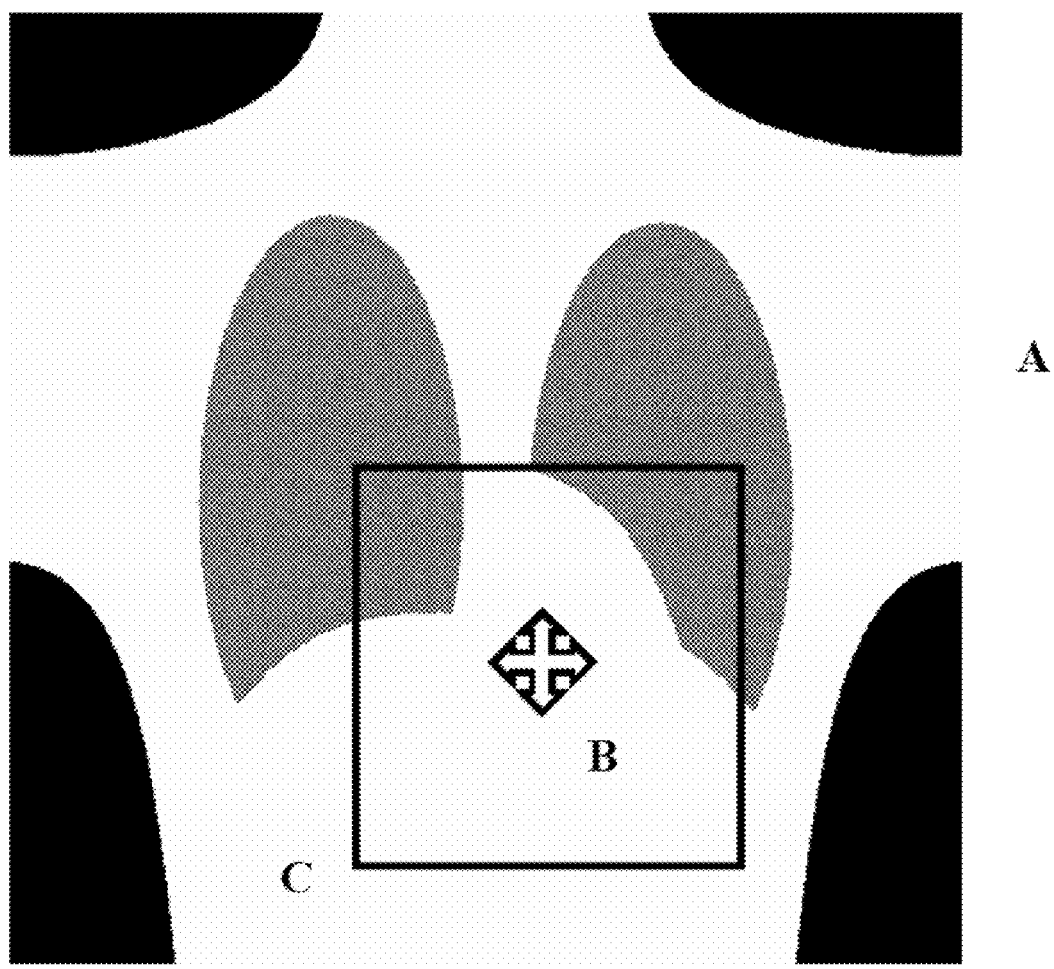
FIG. 2 illustrates a second embodiment of a display window and interactive user controls for the adjustment of density and contrast according to the present invention.

FIG. 2 shows an alternative embodiment with one indicium and a limited area.

In this figure the limited area is region (C). As long as the movements of the cursor (B) are located within the indicated region, one of the two enhancement methods is used, preferably the second enhancement method. As the cursor leaves this indicated region, the other enhancement method is used to adjust the contrast and density of the displayed image.

In a second embodiment, the amount of density and contrast adjustment by the first enhancement method and the amount of density and contrast adjustment by the second enhancement method are deduced from the current state of a single indicium.

Preferably the deviation from the initial position (reference position) of the indicium is used to deduce the relative amounts of adjustments established by both enhancement methods. Small density and contrast adjustments are established by the second enhancement method. The larger the deviation, the more the first enhancement method is used.

An example of a weighting function establishing this relationship is the tangens hyperbolicus function:

$dc=x*dx$ and $dw=(1-x)*dx$ with $x=\tan h(c*dx)$ and $c$ a scaling factor $dg=y*dy$ and $dl=(1-y)*dy$ with $y=\tan h(c*dy)$ and $c$ a scaling factor Another possibility is to establish the adjustments by the second enhancement method until a maximum amount of contrast and density change by the second enhancement method is reached (maxDc, maxDg) and the first enhancement method is used to further modify the displayed image:

$dc=\min(dx, maxDc)$ and $dw=\max(0, dx-dc)$ $dg=\min(dy, maxDg)$ and $dl=\max(0, dy-dg)$ In a third embodiment, the amount of density and contrast adjustment by the first enhancement method and the amount of density and contrast adjustment by the second enhancement method are deduced from the trajectory of an indicium.

Preferably the direction of movements of this indicium is used to deduce the relative amounts of adjustments established by both enhancement methods. As long as the user moves the indicium (e.g. the cursor) into the same direction, the amount of adjustment by the first enhancement method is gradually increasing and the amount of adjustment by the second enhancement method is gradually decreasing.

As the user starts moving the cursor into the opposite directions, the further adjustments are first established by the second enhancement method.

Moving the cursor into the same direction is defined as a constantly increasing or decreasing of the required density or contrast adjustment dy and dx. Moving the cursor into the opposite direction is defined as changing from an increasing required density or contrast adjustment to a decreasing required density or contrast adjustment and visa versa. Still other definitions are possible.

FIG. 3

In a fourth embodiment, the amount of density and contrast adjustment by the first enhancement method is computed to approximate a target window width/level setting.

Figure 3:
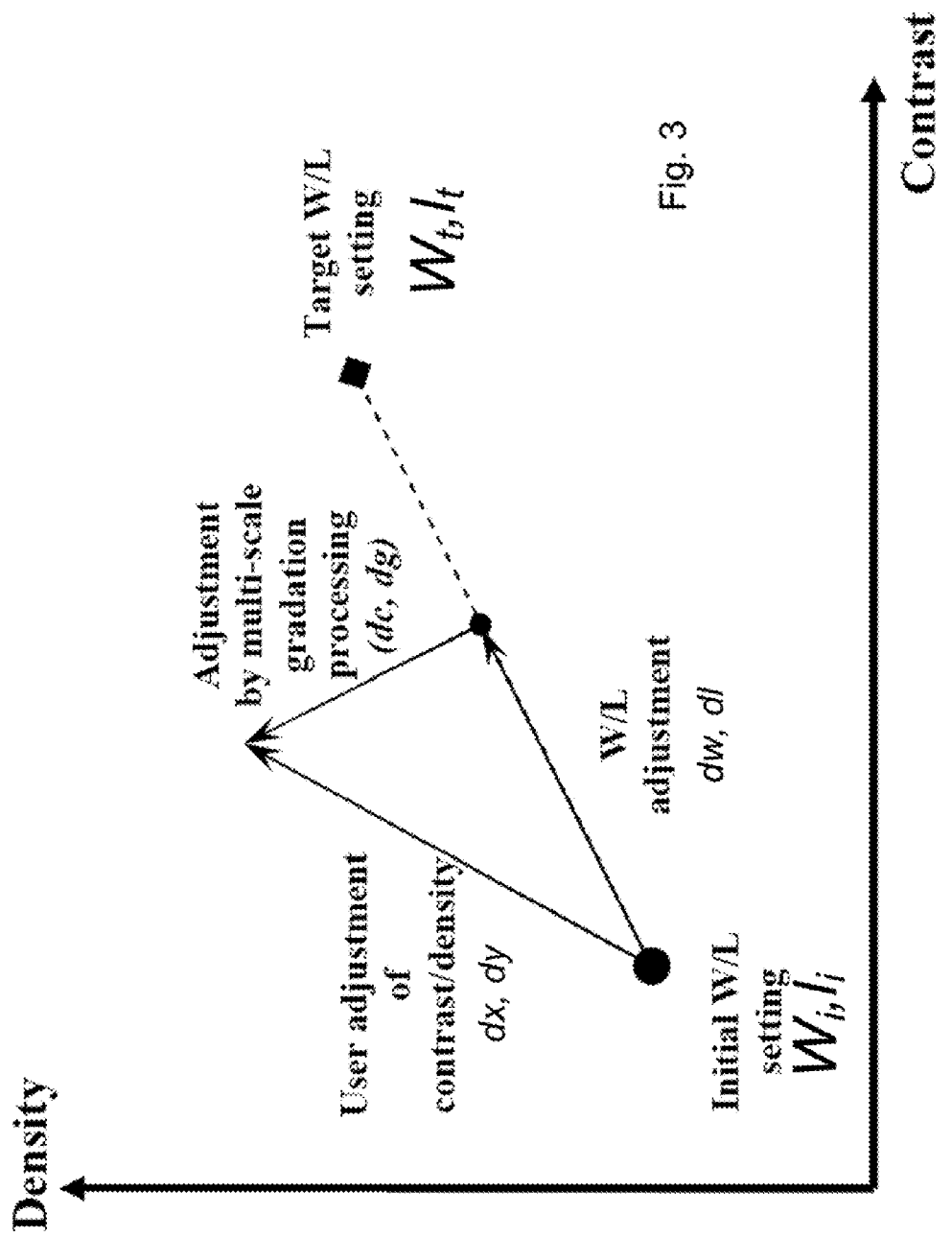
FIG. 3 illustrates a decomposition of the user input for change of contrast and density into an amount for changing contrast and density by the first enhancement method and an amount for changing contrast and density by the second enhancement method, according to a third embodiment.

Referring to FIG. 3, the adjustment vector (dx, dy) resulting from the deviation of the current position of the first indicium from the initial position $(w_i, l_i)$ at the start of the interactive adjustment session, is decomposed into a first adjustment vector along the direction to a target window width/level setting $(w_t, l_t)$ and a second adjustment vector, preferably orthogonally to the first one, the sum of both adjustment vectors being equal to the adjustment vector (dx, dy). The first adjustment vector specifies the amount of contrast and density change resulting from the first enhancement method (dw, dl) and the second adjustment vector specifies the amount of contrast and density change resulting from the second enhancement method (dc, dg).

FIG. 4

Figure 4:
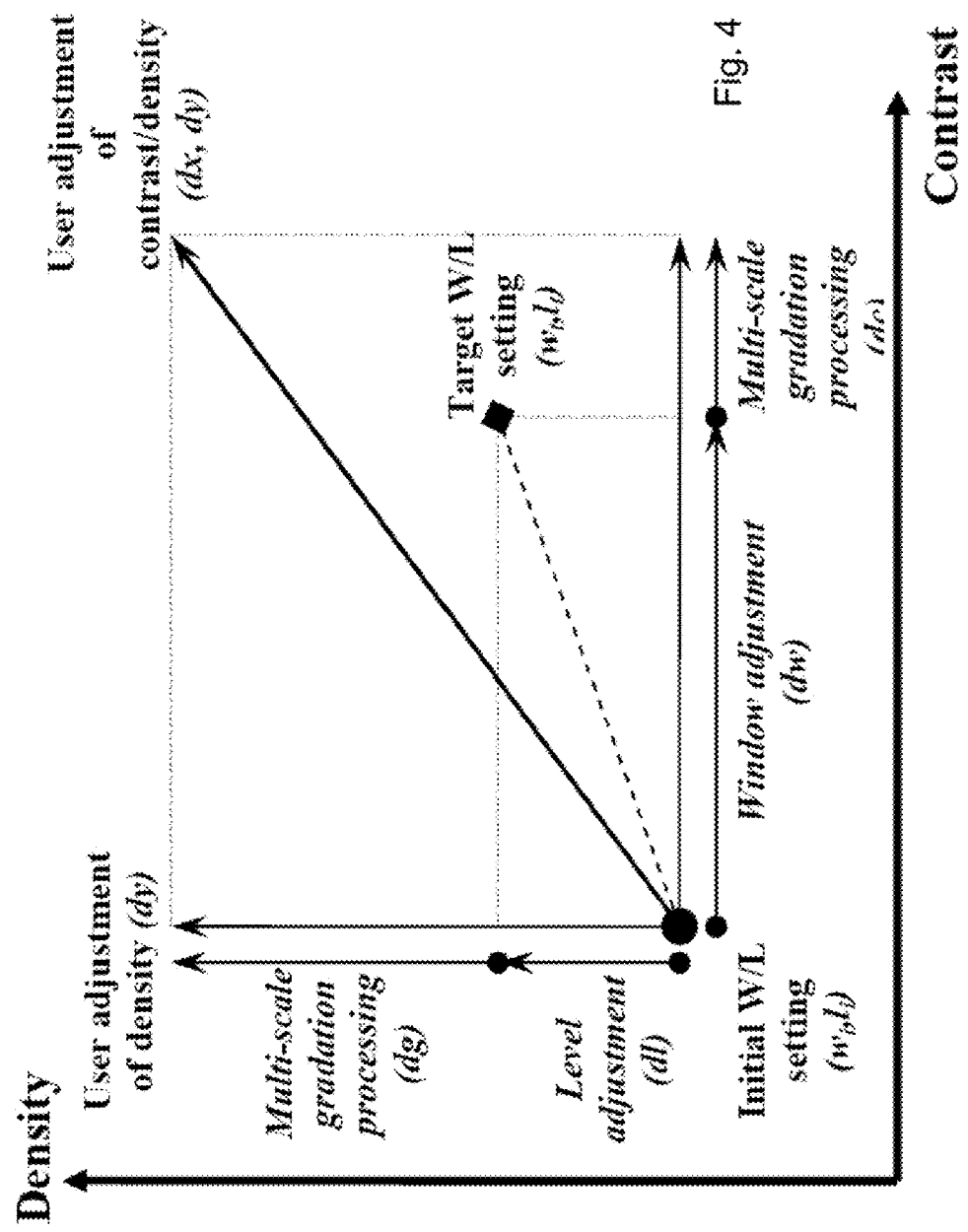
FIG. 4 illustrates a decomposition of the user input for change of contrast and density into an amount for changing contrast and density by the first enhancement method and an amount for changing contrast and density by the second enhancement method, according to the fourth embodiment.

Alternatively, referring to FIG. 4, the adjustment vector (dx, dy) resulting from the deviation of the current position of the first indicium from the initial position $(w_i, l_i)$ at the start of the interactive adjustment session, is decomposed into an amount of contrast adjustment dx and an amount of density adjustment dy. The amount of contrast adjustment dx is decomposed into an amount of contrast adjustment dw resulting from the first enhancement method to approximate the target window width setting $w_t$ and an amount of contrast adjustment dc resulting from the second enhancement method with the combination of dw and dc equal to the amount of contrast adjustment dx. The amount of density adjustment dy is decomposed into an amount of density adjustment dl resulting from the first enhancement method to approximate the target level setting $l_t$ and an amount of density adjustment dg resulting from the second enhancement method with the combination of dl and dg equal to the amount of density adjustment dy.

In the preferred embodiment the target window width/level setting $(w_t, l_t)$ is computed based on the grey value distribution of the pixels of interest within the processed image.

A possible implementation is to compute the target window width/level setting $(w_t, l_t)$ based on the minimum en maximum pixel value of the processed image:

$$l_t=(p_0+p_1+k)/2 \text{ and } w_t=(p_1+l-p_0)$$

with $p_0$ the minimum pixel value and $p_1$ the maximum pixel value, k and l being correction values typically equal to 1.

Another implementation is to use the 1% and 99% percentiles of the histogram of the processed image to compute the target window width/level setting $(w_t, l_t)$ according to the formula described above.

Figure 5:
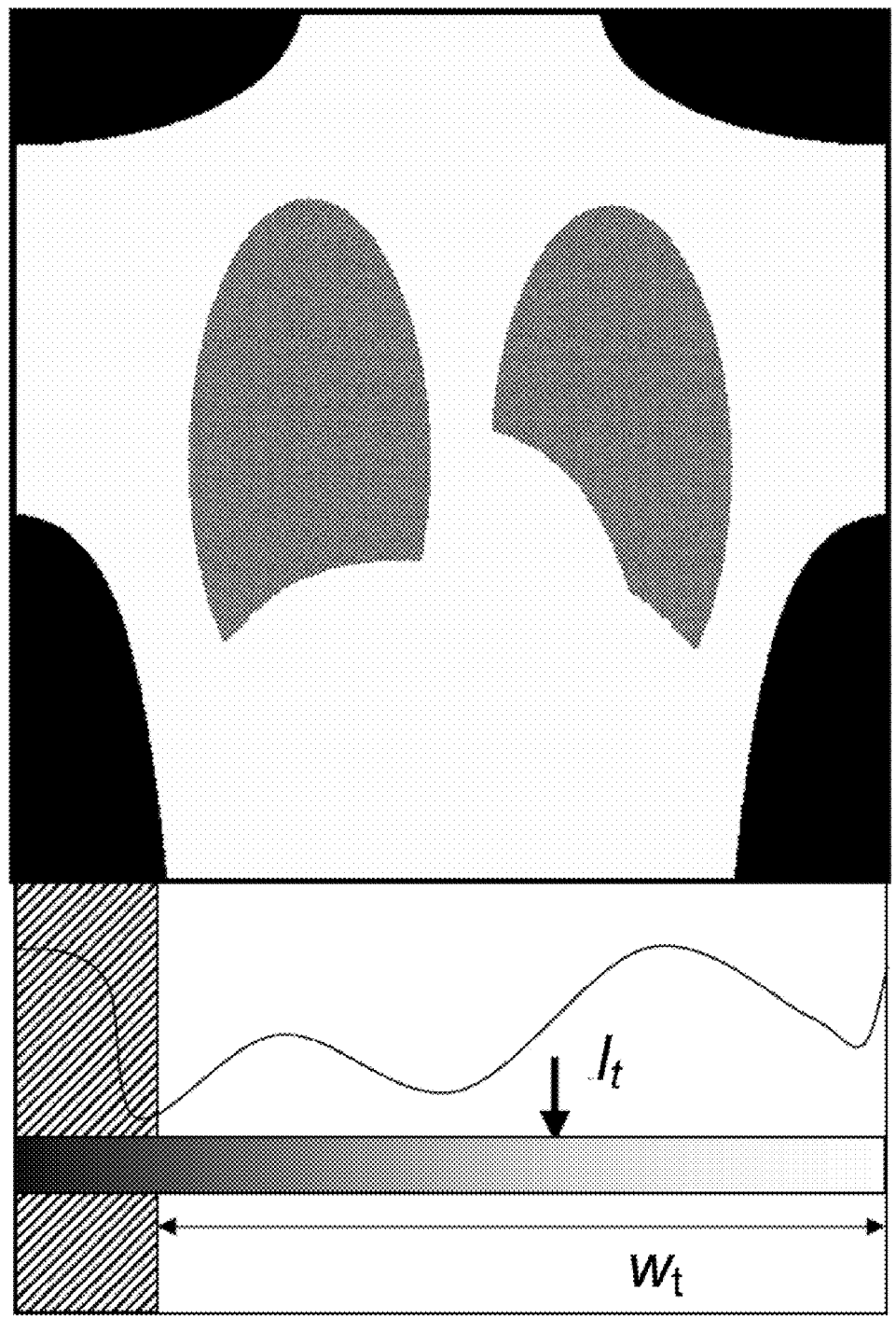
FIG. 5 illustrates the computation of the target window width/level setting based on the grey value distribution of the pixels of interest within a processed image.

Still another, preferred implementation is, referring to FIG. 5, to compute the pixels of interest within the processed image as the non-background and non-foreground pixels and to compute the target window width/level setting $(w_t, l_t)$ such that the grey value distribution of the pixels of interest is displayed over the whole range of densities, from black to white.

While this invention has been particularly shown and described with references to preferred embodiments thereof, it will be understood by those skilled in the art that various changes in form and details may be made therein without departing from the scope of the invention encompassed by the appended claims.

What is claimed is:

1. Method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of a single indicium, and wherein movement of said indicium within a predefined area determines the modification obtained by applying said second enhancement method and wherein the movement of the indicium outside said area determines the modification obtained by applying said first enhancement method.

2. Method according to claim 1 wherein at least one of a first and second indicium is displayed on a display device.

3. Method according to claim 1 wherein said amount of modification obtained by applying said first and said second enhancement method to said image is determined by the amount of movement of a first and second indicium respectively.

4. Method according to claim 3 wherein one of said first and second indicium is a movable cursor and the other of said first and second indicium is a movable slider.

5. Method according to claim 1 wherein modification resulting from said first enhancement method is established by modifying the multi-scale representation of said image, wherein modification is obtained by rescaling and translating the gradient functions along the abscissa axis.

6. Method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of a single indicium and wherein the relative amount of modification by said first and second enhancement methods is determined in accordance with the deviation of the position of said single indicium from an initial reference position.

7. Method according to claim 6 wherein an amount of density modification dw and the amount of contrast modification dl obtained by applying said first enhancement method and the amount of density modification dg and the amount of contrast amplification dc obtained by said second enhancement method are obtained as $dc=x*dx$ and $dw=(1-x)*dx$ with $x=\tan h(c*dx)$ and $c$ a scaling factor, $dg=y*dy$ and $dl=(1-y)*dy$ with $y=\tan h(c*dy)$ and $c$ a scaling factor.

8. Method according to claim 6 wherein the adjustments by the second enhancement method are applied until a maximum amount of contrast maxDc and density change maxDg by the second enhancement method is reached and the first enhancement method is used to further modify the image:

$dc=\min(dx,\mathrm{max}Dc)$ and $dw=\max(0,dx-dc)$ $dg=\min(dy,\mathrm{max}Dg)$ and $dl=\max(0,dy-dg)$.

9. Method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of a single indicium and wherein the amount of density and contrast modification of each of the first and second enhancement methods are deduced from the trajectory of said indicium.

10. Method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of at least one indicium, wherein
the amount of density and contrast enhancement obtained by applying said first enhancement method is computed to approximate a target window width/level setting,
an adjustment vector defining the deviation of the position of a first indicium from an initial position is decomposed into a sum of a first adjustment vector along the direction from said initial position to said target position; and a second adjustment vector; said first and second adjustment vectors specifying the amount of contrast and density modification to be generated by the first and second enhancement methods respectively.

11. Method according to claim 10 wherein said target window/level setting is derived from the distribution of the grey values of pixels of interest in said image.

12. Method according to claim 11 wherein said target window/level setting is determined as $l_t=(p0+p1+k)/2$ and $w_t=(p1+l-p0)$ with p0 being the minimum of the pixel values in said image and p1 being the maximum of said pixel values in said image, k and l being correction values.

13. Method according to claim 12 modified in that p0 is the 1% percentile of the histogram of said image and p1 is the 99% percentile of the histogram of said image.

14. Method according to claim 12 modified in that pixels of interesting said image are determined and said target window width/level setting is adjusted so that the grey value distribution of said pixels of interest covers the available range of densities in a display device.

15. Method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of at least one indicium, wherein
the amount of density and contrast enhancement obtained by applying said first method is computed to approximate a target window width/level setting,
an adjustment vector defining the deviation of the position of a first indicium from an initial position is decomposed into an amount of contrast adjustment dx and an amount of density adjustment dy,
said amount of contrast adjustment dx is decomposed into an amount of contrast adjustment $d_w$ to result from the first enhancement method to approximate the target window width setting $w_t$ and an amount of contrast enhancement adjustment $d_c$ to result from the second enhancement method with the combination of $d_w$ and $d_c$ being equal to dx,
said amount of density adjustment dy is decomposed into an amount of density adjustment $d_l$ to result from said first enhancement method to approximate said target level setting and an amount of density adjustment $d_g$ to result from said second enhancement method with the combination of $d_l$ and $d_g$ being equal to $d_y$.

16. A computer program product in a non-transitory computer readable medium adapted to carry out a method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of a single indicium, and wherein movement of said indicium within a predefined area determines the modification obtained by applying said second enhancement method and wherein the movement of the indicium outside said area determines the modification obtained by applying said first enhancement method.

17. A non-transitory computer readable medium comprising computer executable program code adapted to carry out method of modifying at least one of density and contrast of an image by applying at least one of a first enhancement method for changing density and contrast by modifying the window width/level settings of said image and a second enhancement method for changing density and contrast by modifying a multi-scale representation of an image, wherein modification is derived from at least two gradient functions determined at different scales, a gradient function at a specific scale specifying the dependency of contrast amplification at said scale as a function of density, and wherein the amount of modification obtained by applying either of said first and second enhancement methods is determined by the movement of a single indicium, and wherein movement of said indicium within a predefined area determines the modification obtained by applying said second enhancement method and wherein the movement of the indicium outside said area determines the modification obtained by applying said first enhancement method.

* * * * *

UNITED STATES PATENT AND TRADEMARK OFFICE
CERTIFICATE OF CORRECTION

PATENT NO. : 8,487,958 B2
APPLICATION NO. : 12/625736
DATED : July 16, 2013
INVENTOR(S) : Tom Bertens and Pieter Vuylsteke It is certified that error appears in the above-identified patent and that said Letters Patent is hereby corrected as shown below:

In the Specification:

In column 5, line 14, delete "$gm_k(t) = f_0'(F_1(t) \cdot f_1'(F_2(t)) \cdot \ldots \cdot f_k'(t)$," and insert -- $gm_k(t) = f_0'(F_1(t)) \cdot f_1'(F_2(t)) \cdot \ldots \cdot f_k'(t)$ --.

In column 5, line 26, delete "$F_k'(t) = f_k'(F_{k+1}(t) \cdot f_{k+1}'(F_{k+2}(t)) \cdot \ldots \cdot f_L'(t)$," and insert -- $F_k'(t) = f_k'(F_{k+1}(t)) \cdot f_{k+1}'(F_{k+2}(t)) \cdot \ldots \cdot f_L'(t)$ --.

Signed and Sealed this
Eighth Day of October, 2013

Teresa Stanek Rea
*Deputy Director of the United States Patent and Trademark Office*